April 2, 1935.  I. R. GOSHAW  1,996,330
FLUID CONTROL UNIT
Filed Nov. 3, 1933  2 Sheets-Sheet 1
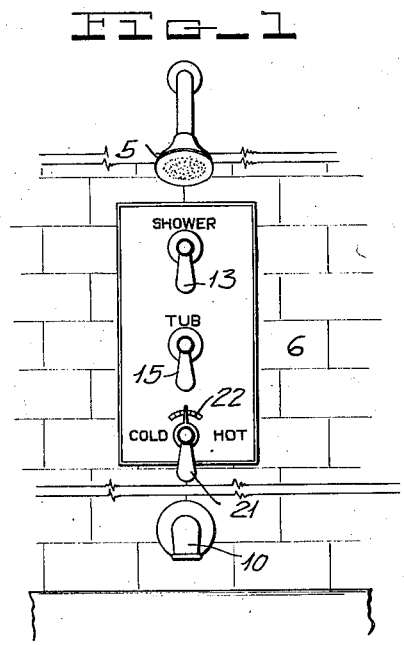
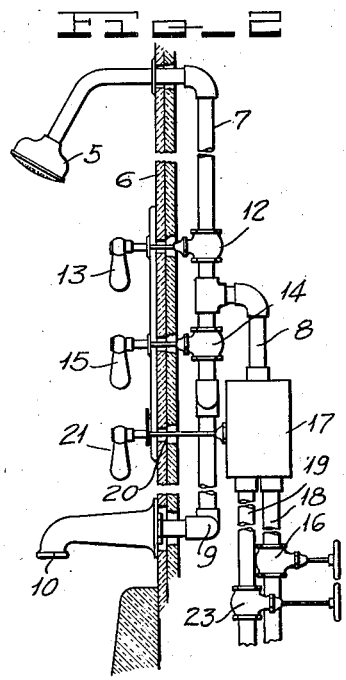
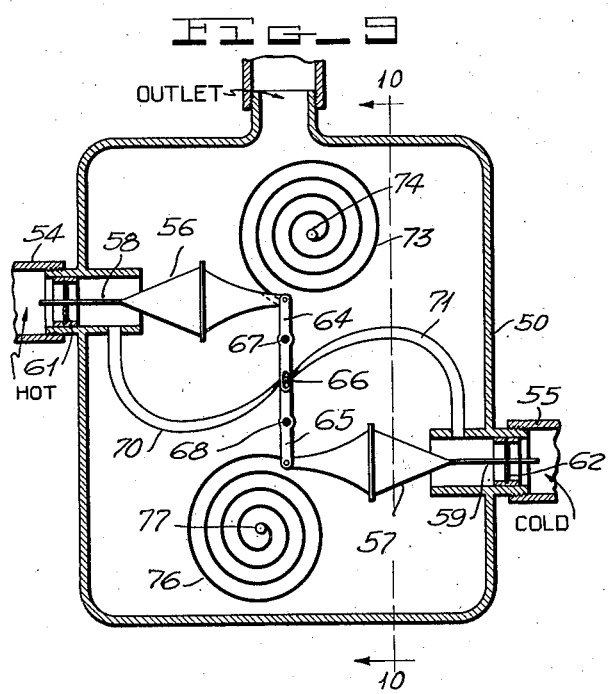
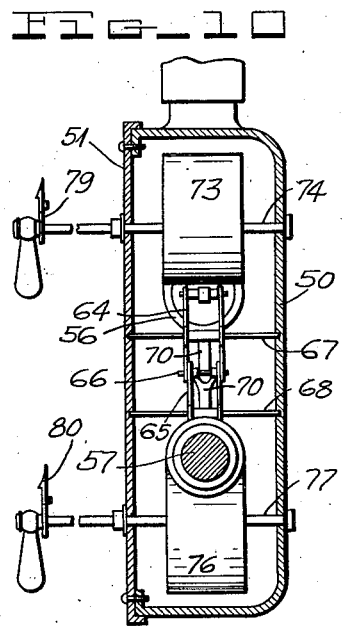
INVENTOR
Irl R. Goshaw
BY
Gordon B Schribell
ATTORNEY April 2, 1935.  I. R. GOSHAW  1,996,330
FLUID CONTROL UNIT
Filed Nov. 3, 1933   2 Sheets-Sheet 2
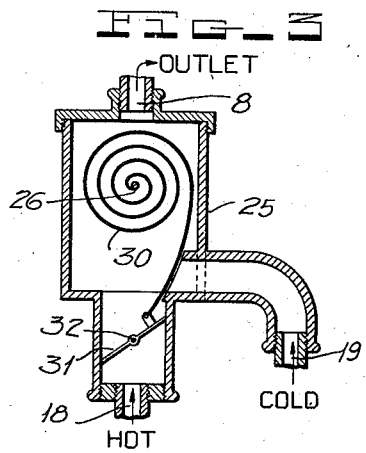
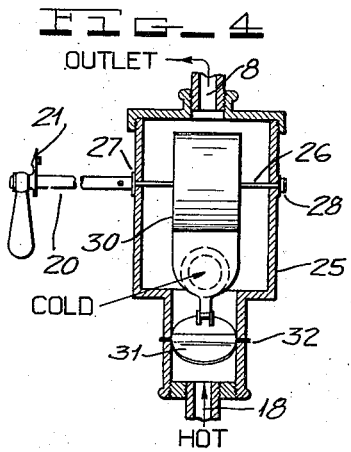
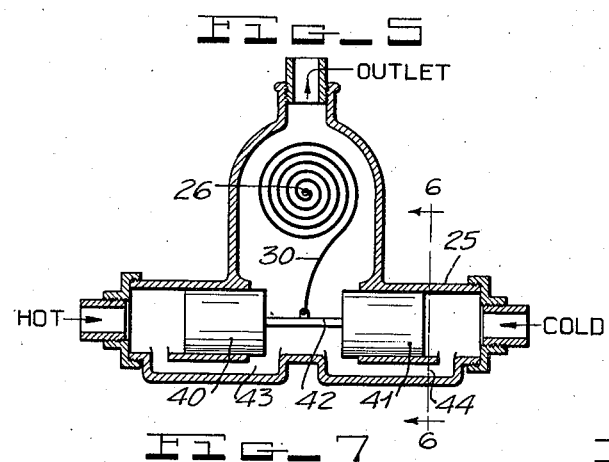
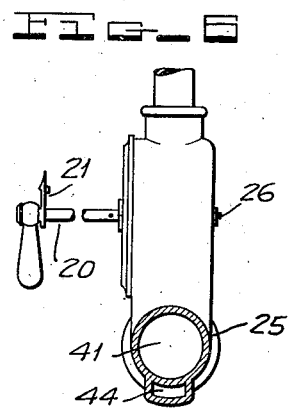
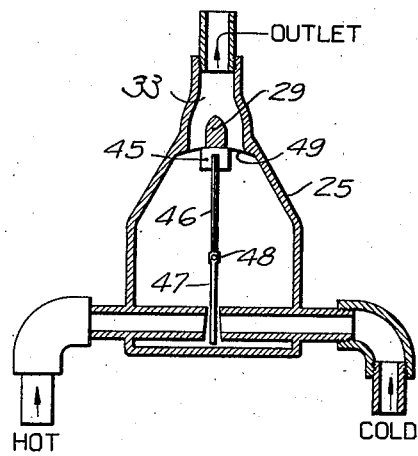
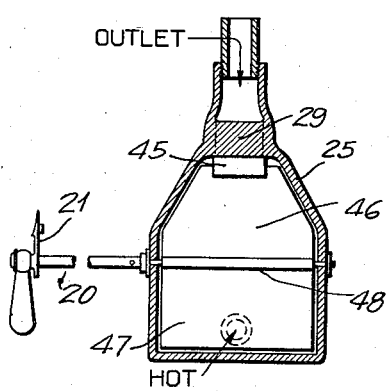
INVENTOR
Irl R. Goshaw
BY
Jadon B. Scheidell
ATTORNEY Patented Apr. 2, 1935

1,996,330

UNITED STATES PATENT OFFICE 1,996,330

FLUID CONTROL UNIT

Irl R. Goshaw, Nutley, N. J.

Application November 3, 1933, Serial No. 696,548

15 Claims. (Cl. 236—12)

This invention relates to fluid control systems and particularly to mixing valves for maintaining a substantially constant predetermined temperature for the mixture of a plurality of fluids each of which may vary in temperature and volume at different rates.

In plumbing systems where hot and cold water are brought together to provide a mixture suitable for lavatory use, the setting of the valve in each supply is usually time-consuming and even after the proper temperature is once obtained there is no certainty that it will remain so during the period of use. There are various causes for temperature changes of the mixture, one of which is that the hot water supply tank is usually at some distance from the common outlet or mixing point and it takes considerable time for this and the cold water outputs to reach the temperatures of their sources. Although these changes are relatively slow, they are not proportional and do require a readjustment of the supply line valves. The chief and most common cause of temperature fluctuations of the mixture, however, is the sudden decrease in the volume of either supply brought about generally by the opening of other outlets in the same system. Many accidents, some of which have been serious, are traceable to this cause. For instance, in shower bath sprays for homes and hotels where the hot water reservoir or tank supplies many outlets, the opening of one or more cold water outlets served by the common system will decrease the cold water supply at each outlet to below normal thus permitting the temperature of the mixture to rise quickly to a dangerous point. Similarly with the opening of a hot water faucet, the temperature goes down and although not dangerous, is nevertheless annoying. Thermostatic devices for controlling the temperature of fluids and for mixing valves are known in the art but none of them provide sufficient rapidity of action to maintain the temperature of the mixture substantially constant when one of the supplies suddenly decreases in volume or pressure. The present invention solves this problem in a simple and efficient manner. In brief, it is a mixing unit which combines directly connected thermostatic and pressure controls that can operate independently of each other or interact with one another, according to the variant, for the purpose of varying the volumes of the incoming fluids which determine the temperature of the mixture.

There are other places where the present invention is needed, such as shampoo sprays in barber shops supplied from common hot and cold water systems and chemical mixing baths where the reaction occurs more efficiently at a certain temperature of the agents.

An object of the invention is to maintain the mixture of a plurality of fluids at a substantially constant predetermined temperature.

Another object of the invention is to mix a plurality of fluids which vary in volume and temperature to provide a mixture having a substantially constant predetermined temperature.

A further object of the invention is to control the hot and cold water supplies at a common outlet at a substantially constant temperature.

The invention will be more fully understood by referring to the following description in conjunction with the accompanying drawings in which:

Figs. 1 and 2 are elevational views of the controls of a shower spray and tub bath embodying the invention;

Figs. 3 and 4 are cross sectional views of a single valve embodiment;

Figs. 5 and 6 are cross sectional views of a differential valve embodiment;

Figs. 7 and 8 are cross sectional views of another embodiment using a differential valve, and Figs. 9 and 10 are cross sectional views of a more sensitive control arrangement.

Referring to Figs. 1 and 2, a shower spray 5 mounted on a structure 6 such as a wall is fed from a pipe 7 connected to a pipe 8. Pipe 8 also feds a pipe 9 having an outlet for a bath tub or the like. A valve 12 operated by a handle 13 controls the volume of water to the spray 5 while valve 14 does the same for the outlet 10 by adjustment of a handle 15. The pipe 8 is the outlet pipe for the mixing valve unit 17 which is supplied with hot and cold water through pipes 18 and 19, respectively. These pipes may have control valves 16 and 23 therein which may be operated or left open at all times. A rod 20 connected to the interior mechanism of unit 17 extends to an accessible position and terminates in an indicator handle 21 cooperating with a temperature scale 22. By the friction between the rod and its packing bearings or between the indicator 21 and its scale holder, the rod will remain in any position of adjustment.

The operation of the above system is extremely simple and safe. After the preliminary adjustment, determining the proper setting at normal temperatures and volumes has been established, it is only necessary thereafter to set the indicator 21 to the temperature desired and then turn the handle 13 or handle 15 to the volume required. Only a few moments are required to let the room temperature water pass off and then the mixture is ready for use with safety. The unit 17 takes care of the mixture thereafter in case of temperature and volume variations in the sources of supply it being understood, of course, that the temperatures of the fluid supplies to be mixed are on opposite sides of the desired temperature. This unit may be any of the following structures connected to pipes 8, 18 and 19 and modified as described hereinafter.

In Figs. 3 and 4 a housing 25 is coupled to the pipes 8, 18 and 19 as indicated. A shaft 26 is rotatably mounted in housing 25 and made leak proof at the bearings by packing nuts 27 and 28. This shaft is coupled to rod 20 which terminates in the indicator handle 21. Fixedly mounted on shaft 26 is a metal coil strip 30 which expands with a rise in temperature, the free end being connected to a butterfly valve 31 mounted on a shaft 32 which may be a drive fit in the housing 25. The element 30 may be also be bimetallic if desired. The extension between the coil proper and the butterfly 31 is adjacent the cold water outlet thus forming a partial closure member therefor.

The operation of this unit is as follows. When either valve 12 or 14 (see Fig. 2) is opened, the handle 21 is set to the desired temperature of the mixture. Of course the handle 21 may be set first, this action setting the spring coil to provide a mixture at a certain volume and temperature if the volumes and temperatures of the water supplied in the feed pipes are normal. Should the temperature of the hot water be above or that of the cold water below normal, then the thermostatic element will expand to close the hot water butterfly valve, but if the hot water supply be below normal, then the thermostat will contract and open the butterfly valve. As these temperature changes at normal volume are slow the element 30 will adjust for them. However, for a sudden decrease in cold water volume wherein the thermostat will not act rapidly enough, the water inputs are equalized without it. In normal operation, the cold water supply pressure holds the eliptical butterfly 31 open against the tension of the spring coil 30. That is, the handle 21 is adjusted to have the thermostat operate against this pressure so that the valve 31 is held in the correct open position by the cold water pressure against the spring tension. It is obvious, therefore, that should the supply of cold water diminish, decreasing the pressure against valve 31, the butterfly closes and decreases the hot water supply proportionately. This unit was operated successfully when using an automobile circulating water butterfly valve in the present design. This unit therefore operates on both temperature and volume changes, the same valve being under control of both simultaneously.

Referring now to Figs. 5 and 6, a double action type of unit is illustrated, Fig. 6 being a section of Fig. 5 along line 6—6. The metal thermostatic coil 30 in this structure is, however, connected to two slide valves 40 and 41 shown partially closing the openings of the hot and cold water inlets. These valves are rigidly interconnected by a strip 42 to the coil 30. Expansion of the coil 30 caused by heat closes the hot water inlet as it opens the cold water inlet and vice versa, thus producing a quicker and more positive action. It is to be understood that these valves may or may not be absolutely water tight when completely closed. The valves 40 and 41 may be cylindrical plugs preferably of light non-rusting material such as aluminum. The interconnecting passages 43 and 44 may be smaller than that of the main input pipes to provide a resistance to back pressure when the main line pressure drops. This unit operates in the same manner as the one shown in Figs. 3 and 4 but when the pressure of the cold water supply is reduced and the hot water valve is allowed to close accordingly, the cold water valve opens wider and vice versa. In this modification the areas upon which the pressure acts have been equalized allowing the thermostat to control when the pressures are equal but letting the pressure take command if the pressure varies. Furthermore, the valve orifices or ports may be made rectangular so that valve travel is equal to valve area or in other shapes depending on the pressure of each supply source.

In Figs. 7 and 8 another differential type of control unit includes a rectangular valve 45 movable across seat portions 49 thus controlling the two inlets leading to a mixing chamber 33. The central seat portion 29 is formed from part of the casting. The valve 45 may be mounted on a bimetallic element or single metallic strip 46. An extension 47 of the strip is fulcrumed on a shaft 48 rotatably mounted in the housing 25 in the same manner as shafts 26 in Figs. 3 to 6, inclusive, but with somewhat less tension. The element 46 divides the housing 25 into two sections and moves the valve 45 from side to side, simultaneously increasing the output of hot water as it decreases the cold output and vice versa. Because of the bimetallic or metallic strip a change in temperature of either supply moves the valve 45 to compensate for the change in the usual way. When the pressure of either the hot or cold supplies varies, the pressure equilibrium is disturbed at the extension 47 resulting in temperature equalization, in accordance with volume. That is, should the cold supply be decreased, the pressure on the extension 47 is diminished and the valve 45 under the pressure from the cold water supply is moved to the left about the shaft 48 thus opening the cold water outlet as it closes the hot water outlet. If this variation in pressure continues, the thermostatic element then adjusts for any further changes in temperature of the supplies. The central seat portion may also be omitted. The rectangular valve then being set somewhat within the inlet. These orifices may also have a shape depending on the pressure of each source.

In Figs. 9 and 10 a more complex mixing unit comprises a casting 50 with a closing member 51 secured in any well known manner to casting 50. Hot and cold water inlets 54 and 55 have cone shaped valves 56 and 57, respectively fitted therein. Guides 58 and 59 attached to the valves travel in centering spiders 61 and 62 to maintain the valves in position, the other ends of the valves being connected to link members 64 and 65 interconnected by a pin 66 in elongated holes in links 64 and 65. The link members are fulcrumed at 67 and 68 so that movement of the pin 66 to the left opens valve 56 and closes valve 57. Similarly a movement of the pin 66 to the right opens valve 57 and closes valve 56. To the pin 66 are connected hollow flat Bourdon gage elements 70 and 71 sensitive to pressure changes, the open ends thereof being exposed to the pressure in the hot and cold water supply pipes, respectively. At the hinged connection between the valve 56 and link 64 is connected the movable terminal of a metallic thermostatic coil member 73 fixedly mounted to a shaft 74 rotatably mounted in casting 50 similarly to the construction of the above described units. A similar coil 76 is connected to the valve 57 and to a shaft 77. The shafts 74 and 77 have adjusting indicator handles 79 and 80, respectively, for the purpose of setting the valves to the temperature desired at all times. Fig. 10 shows a section of Fig. 9 along a line 10—10.

The unit of Figs. 9 and 10 operates as follows. The adjustment of the coils 73 and 76 positions the valves 56 and 57 to provide the proper temperature of the mixture at normal pressure. It is to be understood that the linking at pin 66 is loose to permit a certain independent adjustment of these valves to compensate for unequal normal supplies of either hot or cold water. Now should the cold water supply diminish, the element 71 contracts further opening valve 57 to permit all possible cold water supply to be available while closing hot water valve 56 proportionately to the decrease in cold water volume. Similarly a decrease in the hot water supply causes element 70 to close the valve 57 and open valve 56. However, if the volumes stay constant but the hot water temperature increases, the thermostat 73 expands and tightens valve 56 and tends to open valve 57. Because of the lash in the coupling at 66, valve 56 will be closed first which may be sufficient adjustment for small temperature rises. If the temperature continues to rise, however, valve 57 will be opened accordingly increasing the cold water supply. The opposite action occurs with a lowering of the temperature of the hot water supply. The thermostatic element 76 acts similarly but as the likelihood of the temperature of the cold water source changing is remote, element 76 serves as a stabilizer for the system to eliminate water hammer as adjustments are made. That is, the valve 57 is acting under the spring tension of coil 76 and may be adjusted against it by the elements 70 and 71, the valve 57 being in a more or less floating position. This also is true of the valve 56 but the thermostatic element 73 being near the outlet of the unit is made stronger thus predominating over the element 76. Of course, elements 70 and 71 have a certain thermostatic action but it is substantially balanced. It is to be understood that other types of thermostatic units may be used, such as the bellows type containing a volatile fluid and other bimetallic arrangements.

The above units serve to control the output temperature of the mixture of the hot and cold fluids varying in temperature and volume in any direction and is especially adaptable to shower the shampoo sprays. The use of the units saves time, water consumption and injury from scalding water, while providing a convenient control. Other arrangements and modifications of the apparatus for specific purposes are apparent to those skilled in the art, such modifications being within the scope of the appended claims.

What is claimed is:

1. In a fluid control device for maintaining the temperature of two fluids, varying in temperature and volume, at a substantially constant intermediate temperature, comprising a casing having a plurality of inlets and an outlet, a plurality of valves operative by pressure to control the flow of said fluids from said inlets to said outlet in accordance with changes in pressure of said fluids, and thermostatic means directly connected to said plurality of valves for controlling the operation thereof in accordance with the temperatures of the fluids being mixed.

2. In a fluid control device, the combination of a casing, an inlet to said casing for a relatively high temperature fluid, another inlet to said casing for a relatively low temperature fluid, an outlet from said casing for the mixture of said fluids, a plurality of valves intermediate said inlets and said outlet, means operated directly by the differential in pressure between said high and low temperature fluids for controlling the flow of each of said incoming fluids through said valves, and means connected to said last mentioned means operated directly by the temperature of said mixture to maintain a substantially constant temperature of said mixture at said outlet.

3. In a fluid control device, the combination of a casing, an inlet to said casing for a relatively high temperature fluid subject to changes in temperature and pressure, another inlet to said casing for a relatively low temperature fluid subject to changes in temperature and pressure, an outlet from said casing, a valve controlling the volume of said high temperature fluid flowing to said outlet, another valve controlling the flow of said low temperature fluid to said outlet, means directly operated by the differential in pressure between said fluids for varying the volume of said fluids and means directly connected to said last-mentioned means for operating said means to maintain a substantially constant temperature for the mixture from said outlet.

4. In a fluid control device, the combination of a casing, an inlet to said casing for a relatively high temperature fluid subject to irregular changes in temperature and volume, another inlet to said casing for a relatively low temperature fluid subject to irregular changes in temperature and volume, an outlet from said casing, a valve controlling the volume of said high temperature fluid flowing to said outlet, another valve controlling the flow of said low temperature fluid to said outlet, said valves being operated by the differential between the volumes of said fluids, and means operating said valves during temperature changes of said fluids to vary the volume of said fluids to maintain a substantially constant temperature for the mixture from said outlet.

5. In a fluid control device, the combination of a mixing chamber provided with inlet passages for relatively hot and cold fluids and a discharge passage for a mixture of the same, a valve for each inlet passage, a connecting member between said valves, said valves being balanced at normal pressures of said fluids and decreasing the flow of the higher pressure fluid and increasing the flow of the lower pressure fluid when the pressure of the higher pressure fluid increases, and a thermostatic element connected to said connecting member for controlling the fluids at normal pressures when said temperatures vary to maintain a substantially constant temperature for the mixture thereof.

6. In a fluid control device, the combination of a mixing chamber having inlet passages for relatively hot and cold fluids and an outlet passage for the mixture of said fluids, a valve intermediate each inlet passage and said outlet passage, said valves being interconnected, hot and cold fluid passages for simultaneously transmitting pressure of said fluid to said valves, means for applying the pressures of said supply fluids directly to said valves to maintain a balanced relationship therebetween, thermostatic means for controlling the adjustment openings of said valves during changes in temperature of said fluids, and means for controlling the normal operating position of said thermostatic means.

7. In a fluid control device, the combination of a mixing chamber having inlet passages for relatively hot and cold fluids, and an outlet passage for the mixture of said fluids, a valve interposed between each of said inlet passages and said outlet passage, said valves being interconnected, a rotatable member within said chamber and external thereto, means connecting said member and said valves, said means operating said valves upon changes in temperature of said fluids, and means controlling said valves during changes in pressure of said fluids.

8. In a fluid control device, the combination of a mixing chamber having inlet passages for relatively hot and cold fluids and a discharge passage for said fluids, valves for controlling the volume of each of said fluids interposed between each of said inlet passages and said discharge passage, means to automatically actuate both of said valves upon changes in pressure of either of said fluids, and means to actuate said valves upon changes in temperature of either of said fluids.

9. In a fluid control device, the combination of a mixing chamber provided with inlet passages for relatively hot and cold fluids and a discharge passage for a mixture of the same, means intermediate each of said inlet passages and said outlet passage for controlling the volume of each of said fluids therebetween, and means for automatically actuating said last-mentioned means upon changes in temperature of the mixture of said fluids, said last-mentioned means being directly actuated by pressure differentials to maintain said mixture at a substantially constant temperature.

10. In a mixing valve for relatively hot and cold fluids, a mixing chamber having inlet passages for said fluids and a discharge passage for the mixture thereof, means for controlling the valume of said fluids to said outlet passage, means directly operating said volume controlling means by changes in pressure of said fluids, said means directly operating said volume controlling means by changes in temperature of said fluids, said pressure and temperature operated means cooperating to maintain the mixture of said fluid at a substantially constant predetermined temperature.

11. In a mixing valve, the combination of a mixing chamber having inlet passages and an outlet passage, means positioned in at least one of said passages for controlling the volume of flow of fluid therethrough, and means for automatically adjusting said last-mentioned means upon changes in temperature, said last-mentioned means being influenced by changes in pressure of the fluid in another of said inlet passages whereby the volume from each of said inlet passages is maintained substantially equal.

12. In a mixing valve, the combination of a mixing chamber having inlet passages and an outlet passage, means positioned in at least one of said passages for controlling the volume of fluid flow therethrough, and means for automatically adjusting said last-mentioned means upon changes in temperature, said last-mentioned means being influenced by changes in pressure of the fluid in another of said inlet passages whereby the volumes from said inlet passages are maintained at a relationship to provide a substantially constant predetermined temperature.

13. In a mixing valve for relatively hot and cold fluids, the combination of a mixing chamber having inlet passages, a common housing leading to said inlet passages, means for substantially dividing said housing into an individual passage for each of said hot and cold fluids, and a valve member for controlling the flow of said fluids through said inlet passages, said dividing means being connected to said valve member and sensitive to temperature and pressure variations in either of said supply fluids to control the temperature of the mixture of said fluids by adjusting said valve member.

14. In a fluid control device, the combination of a mixing chamber having inlets thereto, a common supply housing for carrying fluids of different temperatures connected to said chamber, means at said inlets for varying the volumes of the fluids flowing therethrough, and means separating said supply housing into divisions, said means adjusting said last mentioned means upon changes in pressure and temperature of either of said fluids.

15. In a fluid control device, a mixing chamber, a housing connected to said chamber, said housing carrying fluids of different temperatures, a member at the entrance to said mixing chamber for controlling the flow of each of said fluids to said mixing chamber, and temperature sensitive means within said housing and connected to said member, said means being pivoted at a point between its terminals for adjusting said member upon changes in pressure of either of said fluids.

IRL R. GOSHAW.